July 30, 1940.  M. J. DOWLING  2,209,447
MILK STRAINING UNIT
Filed Feb. 2, 1939   2 Sheets-Sheet 1
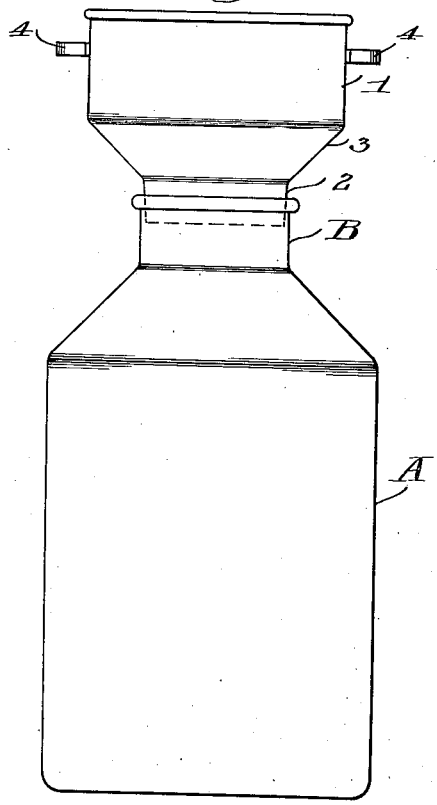
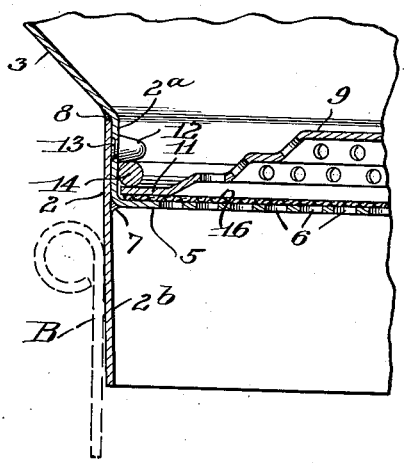
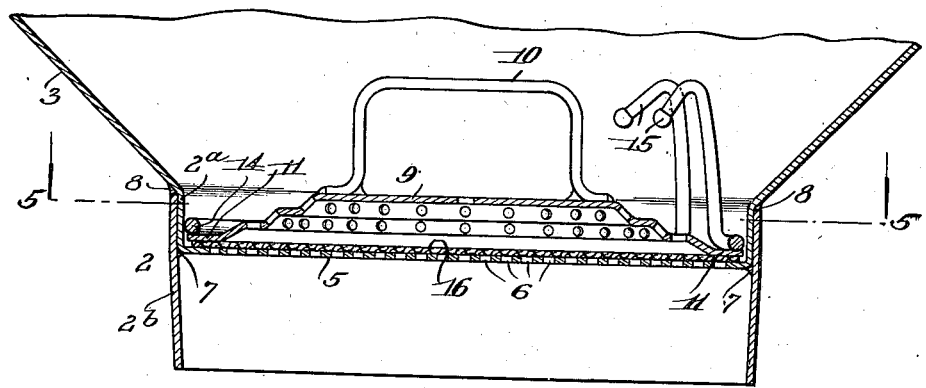
INVENTOR.
Martin J. Dowling
BY
his ATTORNEY.

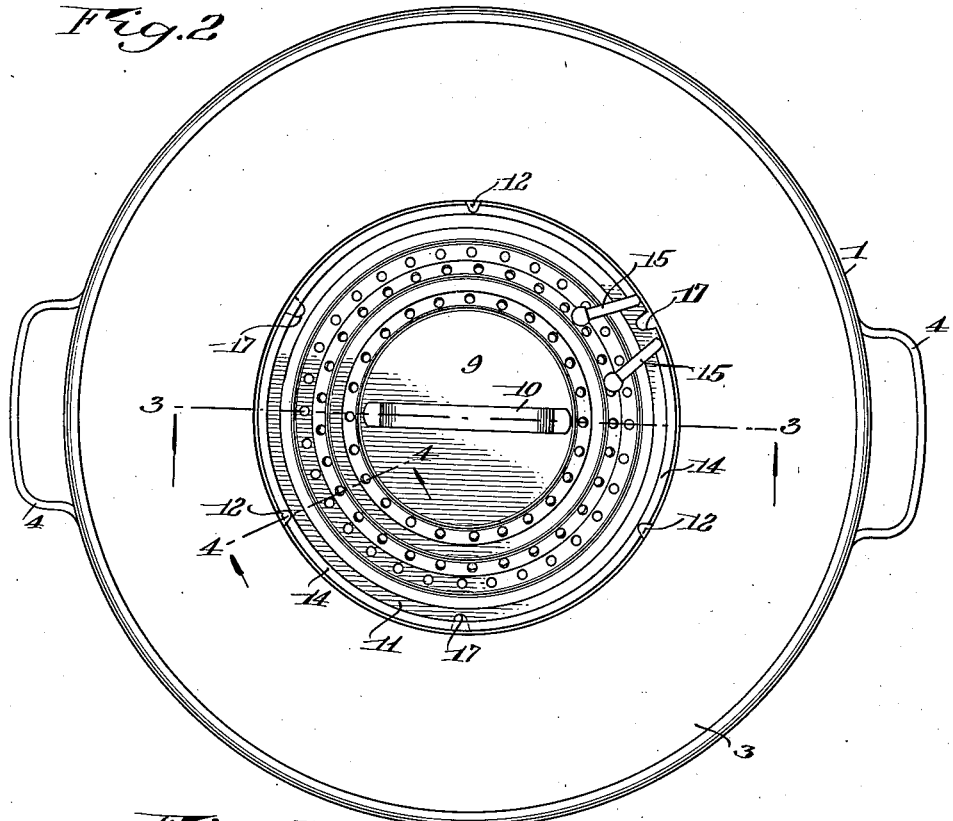
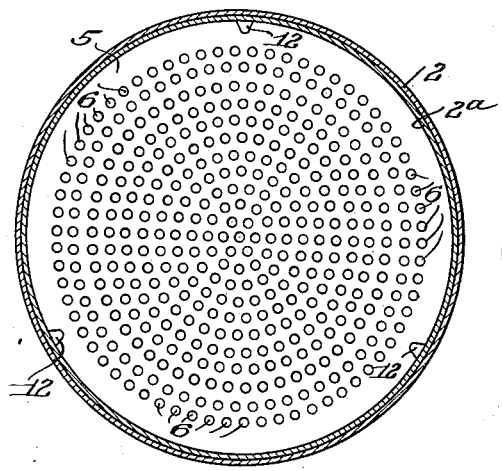
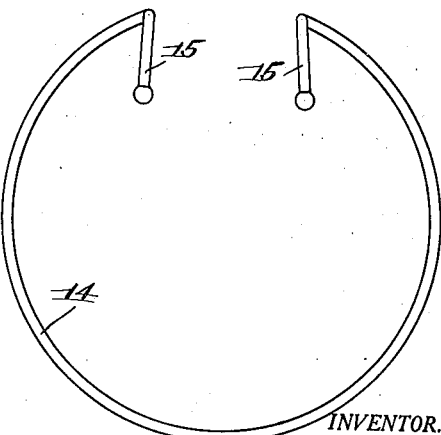

Patented July 30, 1940

2,209,447

UNITED STATES PATENT OFFICE 2,209,447

MILK STRAINING UNIT

Martin J. Dowling, Rochester, N. Y., assignor to Atlantic Stamping Company, Rochester, N. Y., a corporation of New York Application February 2, 1939, Serial No. 254,261

2 Claims. (Cl. 210—159)

My present invention relates to liquid strainers and more particularly to detachable units of this nature that are applied to the necks of ordinary ten-gallon milk cans when filling them at the dairy farm, and the invention has for its object to provide a safe, sturdy and convenient unit of this kind that may be manufactured at a reasonable cost. The improvements are directed in part toward the means for fitting the strainer bowl securely on the can and toward providing detachable filtering elements on the inside thereof that may be easily inspected, removed and replaced from above without removing the unit from the can.

To these and other ends, the invention resides in certain improvements and combinations of parts, all as will be hereinafter more fully described, the novel features being pointed out in the claims at the end of this specification.

In the drawings:

Fig. 1 is a side elevation of a milk can fitted with a strainer unit constructed in accordance with and illustrating one embodiment of my invention;

Fig. 2 is a top plan view of the strainer unit, much enlarged;

Fig. 3 is a vertical section taken substantially on the line 3—3 of Fig. 2 with the upper portion of the bowl broken away;

Fig. 4 is a further enlarged fragmentary vertical section taken substantially on the line 4—4 of Fig. 2;

Fig. 5 is a horizontal section through the supporting collars taken substantially on the line 5—5 of Fig. 3 with the detachable straining elements and locking devices removed, and Fig. 6 is a detail top view of the locking ring.

Similar reference numerals throughout the several views indicate the same parts.

Heretofore, it has been the common practice to construct milk strainers of this character with a bowl and a collar for insertion in the neck of the milk can, the collar being provided with straining and/or filtering elements. These last mentioned elements, however, were largely applied and detached from the bottom of the collar in the manner of a cap or requiring that the unit be removed from the can when removing or inspecting such elements. A further objection to this practice is that the filtering element takes contact with the can and the lifting of the bowl is apt to detach the unit if the latter fits snugly. With my construction, the filtering and straining elements are entirely within the collar of the bowl and rest upon a rigid diaphragm close to the latter that strengthens the collar at the point at which it takes direct contact with the can neck, these filtering and straining devices being removable upwardly without detaching the unit as a whole from the can.

Referring more particularly to the drawings, A indicates a milk can to be filled and B the neck thereof. The strainer unit in general embodies a wide bowl 1, a collar 2 and an intermediate connecting neck 3, the bowl being provided with lateral handles 4 for lifting it about and inserting it and removing it from the can.

The three principal parts just described, in accordance with my present invention, are drawn mainly from a single piece of sheet metal and in so doing an inner collar $2^a$ terminates at its bottom in an integral foraminous diaphragm having the drain openings 6. An outer and longer downwardly tapered foot collar $2^b$ is, in the process of manufacture, forced at its upper end tightly over the outside of the collar $2^a$ so that it wedges onto the same and additionally it is soldered thereto at the seams, as indicated at 7 on the inside and 8 at the outside.

With this construction it will be seen that the foot collar $2^b$ can be made to fit snugly within the neck B of the can A as the unit is superposed on the latter. As the raw milk from the original source is poured into the bowl 1, buckets may be rested on the edge of the latter and, in any event, as the bowl is filled, it will be seen that it requires substantial anchorage in the neck of the can. The strain of this anchorage is borne by the collar 2 made up of the bowl collar $2^a$ and the foot collar $2^b$, and it will be seen from inspection of Figs. 3 and 4 particularly that the diaphragm 5 is so disposed that, in the general combination, it fortifies the attaching element 2 and braces it rigidly against lateral strains as it sits in the can neck B.

In the continued use of the strainer, there is placed upon the diaphragm 5 a filter 16 for the final purification of the milk. This usually consists of a gauze or textile disk that is perishable in continued use and is replaced as required. Such disk is held in place directly by another upper foraminous straining element in the form of a circular plate 9. Its center is raised and provided with a lifting handle 10. Outwardly it proceeds in downwardly stepped conformation, as appears in Figs. 3 and 4, until its rim 11 rests directly upon the margins of the cloth filtering disk 16. To lock this element 9 against the filter 16 and maintain it securely against the diaphragm 5 with the filter between, the following devices are employed:

Projecting inwardly from the inner wall of the bowl collar 2ª at spaced intervals are a plurality of rounded tapered lugs 12. These are shouldered, are provided with shank portions 13 that extend through the collar 2ª and the shank portions are upset on the exterior to provide rigid attachment.

When the foot collar 2ᵇ is forced onto the collar portion 2ª, it seals and covers the upset shank portions of these lugs and adds to the security of their attachment. The rim 11 of the strainer element 9 when laid upon the filter disk 16 is spaced below the lugs 12. A manually contractable expanding spring ring 14, shown in detail in Fig. 6, occupies this space. It wedges between the tapered lugs 12 and the rim portion 11 and holds the filter element securely. To either apply or detach the ring, its free ends are bent upwardly and inwardly to form operating arms 15. These are pinched together by the operator so that the diameter of the ring is reduced to clear the lugs and when the handle portions are released, the ring engages beneath the lugs.

Thus, in the general use of the unit, it is placed upon and removed from the necks B of successive cans by means of the handles 4. At any time, the condition of the straining and filtering elements may be inspected from above and foreign matter removed by lifting out successively the elements resting upon the diaphragm 5. First, the ring 14 is contracted by means of the handles 15 and taken out. Then, the plate 9 is lifted out, it being provided with notches 17 that clear the lugs 12 when rotated into alinement therewith, finally exposing the filter cloth 16, which may be cleaned or replaced with a new one according to its condition.

Particular attention is called to the fact that the bowl 1, the connecting neck 3, the bowl collar 2ª and the diaphragm 5 at the bottom of the latter are all drawn from a single piece of sheet metal; that the foot collar 2ᵇ is forced thereon and soldered thereto; that the lower end of this foot collar wedges securely into the top of the can, and that the compression strains incident to this wedging and supporting conformation are resisted by the particular location of the diaphragm 5 which is integrally fabricated and is arranged at a point at which it best performs this function.

I claim as my invention:

1. In a milk straining unit or the like, the combination with a bowl, a connecting neck, a lower collar on the neck and a foraminous diaphragm adapted to support a fabric filtering gauze within the neck, all drawn from an integral piece of sheet metal so that the neck terminates in the diaphragm, of a plurality of tapered lugs projecting inwardly from the inner wall of the neck and extending through the latter and upset on the outer wall thereof, a foot collar surrounding the bowl collar to conceal the lugs and joined thereto, an upwardly removable foraminous strainer element disposed on top of the diaphragm but having only a flange portion of its margin lying flat against the diaphragm or gauze, the central portion thereof being raised in a general dome shape and a manually contractable and expanding spring ring adapted to jam beneath the lugs when expanded and to hold the strainer element in place.

2. In a milk straining unit or the like, the combination with a bowl, a connecting neck and a lower collar on the neck having a fixed and rigid foraminous diaphragm at the bottom thereof integrally connected thereto and adapted to support a fabric filtering gauze, of a much longer, slightly tapered foot collar fitted tightly over the neck and having its inner surface secured intimately thereto all the way around, the taper of the foot collar being below the diaphragm so that the foot collar in turn is adapted to wedge into and support the unit in the neck of a milk can whereas the combined thickness of the diaphragm, lower collar and foot collar provide a rigidly greater stop to the extent of the wedging action and means for clamping the gauze in place on top of the diaphragm.

MARTIN J. DOWLING.